(12) United States Patent
Andersson

(10) Patent No.: US 6,196,771 B1
(45) Date of Patent: Mar. 6, 2001

(54) FACE-MILLING METHOD AND APPARATUS

(75) Inventor: Kjell Andersson, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 08/953,640

(22) Filed: Oct. 17, 1997

(30) Foreign Application Priority Data

Oct. 17, 1996 (SE) .................................................. 9603817

(51) Int. Cl.$^7$ .................................................. B23B 27/22
(52) U.S. Cl. .................... 407/113; 407/114; 407/115; 407/116
(58) Field of Search .................... 407/113, 114, 407/115, 116; 409/132

(56) References Cited

U.S. PATENT DOCUMENTS

| | | | | |
|---|---|---|---|---|
| 3,786,541 | * | 1/1974 | Lundgren | 407/113 X |
| 4,616,962 | | 10/1986 | Ushijima et al. | |
| 4,971,483 | * | 11/1990 | Kress et al. | 407/116 X |
| 4,988,242 | * | 1/1991 | Pettersson et al. | 407/115 X |
| 5,032,049 | * | 7/1991 | Hessman et al. | 407/116 X |
| 5,074,720 | * | 12/1991 | Loqvist et al. | 407/114 |
| 5,199,827 | * | 4/1993 | Pantzar | 407/116 X |
| 5,282,703 | * | 2/1994 | Itaba et al. | 407/115 X |
| 5,758,994 | * | 6/1998 | Hintze et al. | 407/116 |
| 5,876,160 | * | 3/1999 | Johnson | 409/132 |

FOREIGN PATENT DOCUMENTS

| | | | | |
|---|---|---|---|---|
| 1260357 | * | 3/1961 | (FR) | 407/113 |
| WO98/07543 | | 2/1998 | (WO) | |

OTHER PUBLICATIONS

Article: "Wendeplattenfräser und Wendeplatten", (1981) Seco Tools AB, Sweden.

* cited by examiner

Primary Examiner—Henry Tsai
(74) Attorney, Agent, or Firm—Burns, Doane, Swecker & Mathis, L.L.P.

(57) ABSTRACT

A face-milling tool includes a milling body forming seats arranged around an axis of rotation of the body. The seats carry identical inserts, each insert being of tetragonal or pentagonal, or hexagonal shape. Each insert includes first and second side faces. Each side face includes a pair of minor cutting edges at each corner of the insert. Two major cutting edges intersect respective ones of the minor cutting edges whereby each major cutting edge and its associated minor cutting edge together form a cooperating pair of cutting edges. There are two of those cooperating pairs at each corner of each side face, whereby there are at least sixteen cooperating pairs on the insert. The minor cutting edges, which function to generate a surface on a workpiece, are sharper than the major cutting edges. During a milling operation the insert is oriented so that only one cutting corner engages a workpiece, and only one of the cooperating pairs of cutting edges of that cutting corner is active.

13 Claims, 4 Drawing Sheets

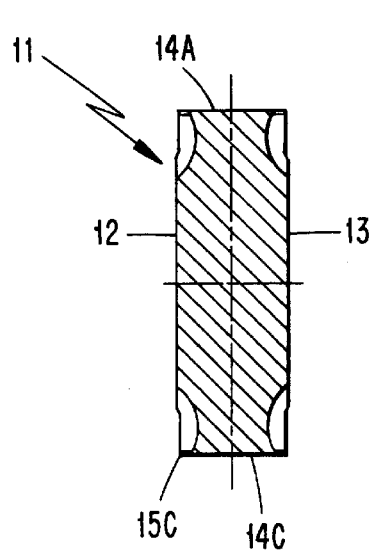
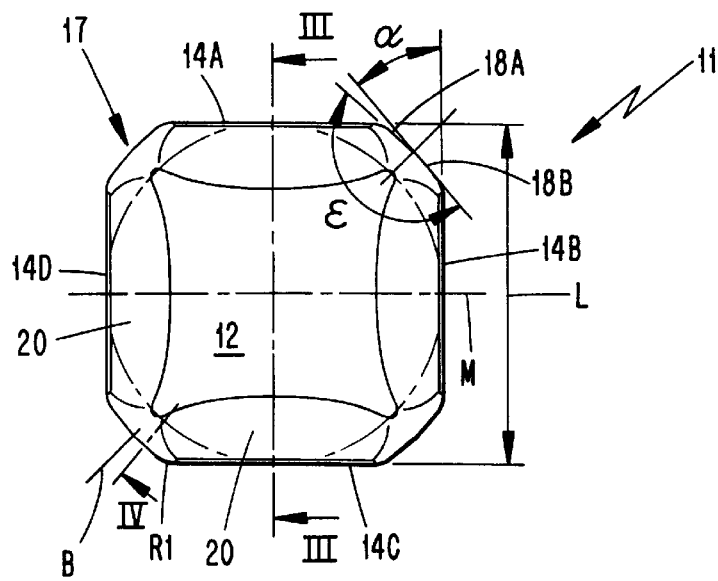
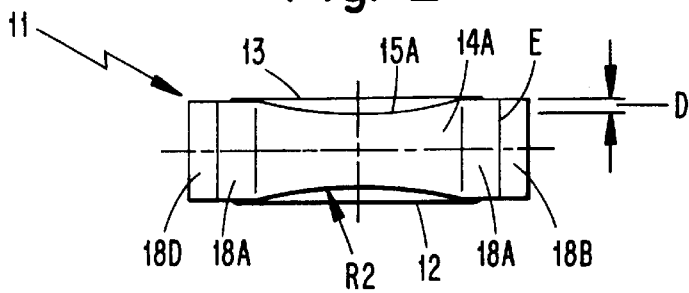
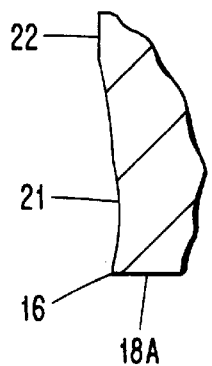
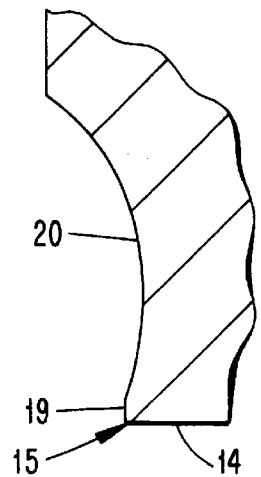

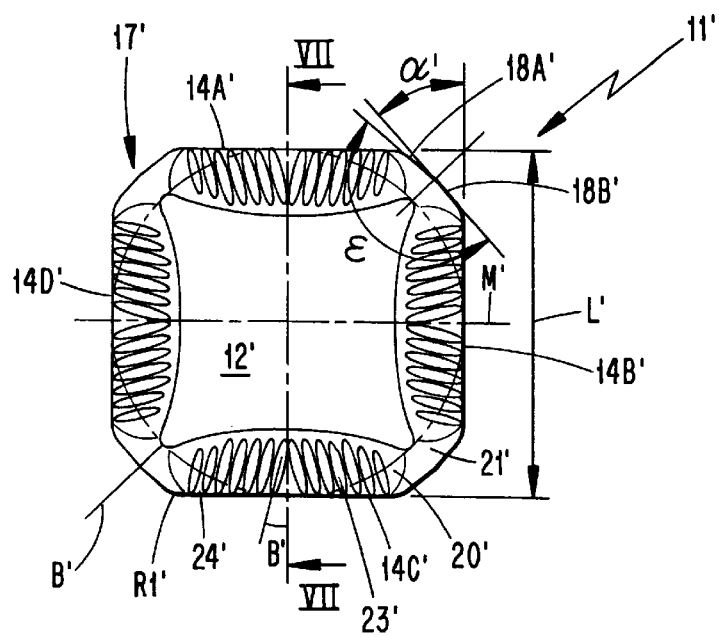
Fig. 5
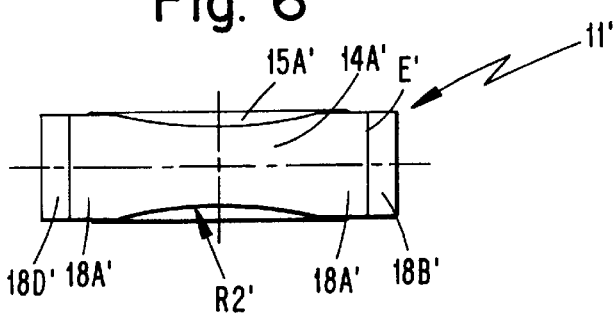
Fig. 7
Fig. 6
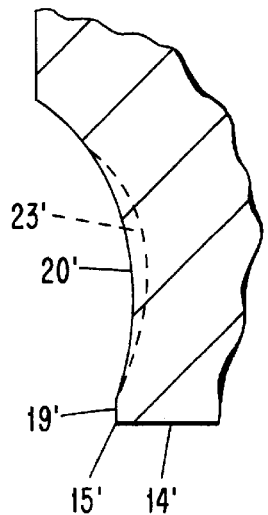
Fig. 7A
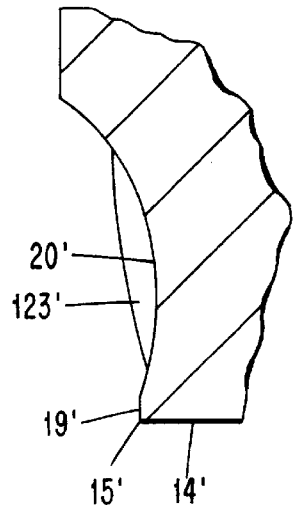
Fig. 7B

Fig. 10
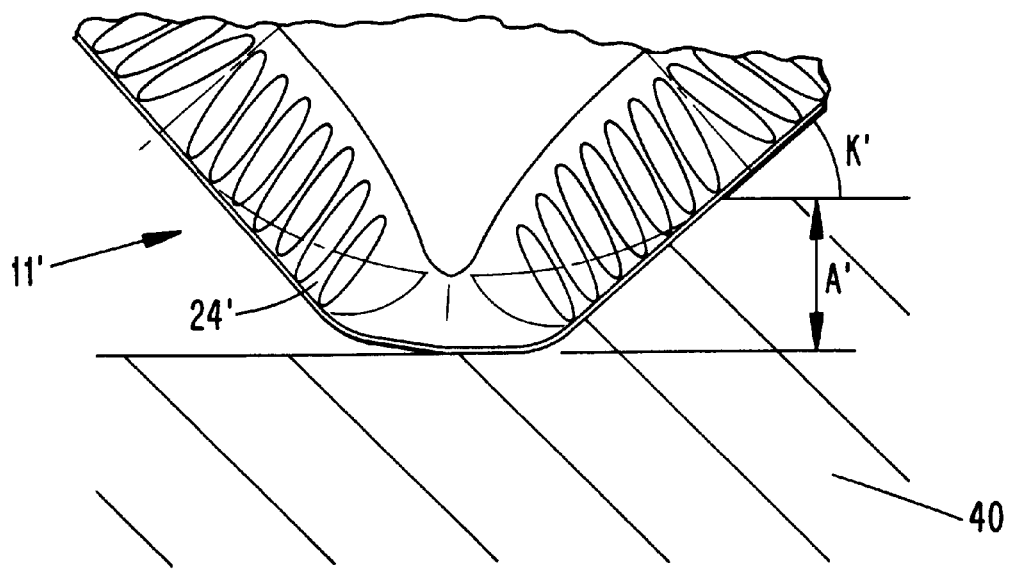
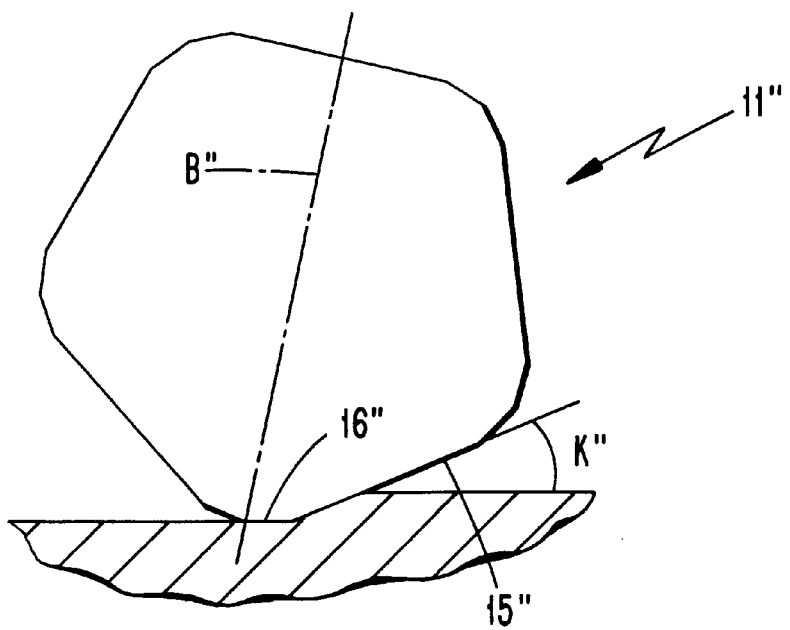
Fig. 11

FACE-MILLING METHOD AND APPARATUS

BACKGROUND OF THE INVENTION

The present invention relates to a tool and a cutting insert for face milling, and to a face-milling method. The insert includes two parallel side faces interconnected by an edge surface structure. The insert has four, five, or six cutting corners. Disposed at each of the corners is a pair of cutting edges comprising a minor cutting edge and a major cutting edge, wherein a minor cutting edge generates a surface on a workpiece during a milling operation.

PRIOR ART

Through British Patent 951,624 there is previously known a tool and an indexable cutting insert substantially of the above-captioned type, wherein the tool is provided such that both minor cutting edges in a respective cutting corner portion of the cutting insert come into engagement with the workpiece during the machining operation. This means that both minor cutting edges in the corner portion are worn simultaneously and therefore for example a tetragonal cutting insert can be indexed, at most, to eight positions (i.e., four positions on each side) having new cutting edges. U.S. Pat. No. 4,616,962 discloses a milling insert with four cutting edges.

OBJECTS OF THE INVENTION

One object of the present invention is to provide a tool for face milling, wherein at least sixteen new cutting edges can be utilized.

Another object of the present invention is to provide a cutting insert for face milling, having cutting edges which makes utilization economically advantageous.

Still another object of the present invention is to provide a cutting insert according to an alternative embodiment which is developed for deflecting the chips in a direction which creates little contact surface, and subsequently a low friction, between the chip and the cutting insert.

These and other objects have been achieved by an indexable face-milling metal-cutting insert which comprises two substantially parallel side faces interconnected by an edge surface structure to define at least four, and not more than six, cutting corners. An intersection of the edge surface structure and the side face at each of the cutting corners forms a pair of minor cutting edges intersecting one another substantially at a bisector of the cutting corner to form an obtuse angle therebetween. An intersection of the edge surface structure and the side face at locations between adjacent ones of the cutting corners forms major cutting edges at both of the adjacent cutting corners. Each major cutting edge intersects an associated one of the minor cutting edges, whereby each major cutting edge and its associated minor cutting edge together define a cooperating pair of cutting edges. The insert is indexable to bring only one of the cooperating pairs at a time into cutting relationship with a workpiece, with the side face being operable as a chip surface, and the edge surface structure being operable as a clearance surface. There are two of the cooperating pairs at each of the cutting corners and the pairs are disposed on opposite sides of the corner bisector.

The invention also relates to a face milling tool which comprises a milling body defining a longitudinal axis and having a plurality of seats arranged around the axis. Indexable metal cutting inserts similar to the type described above are mounted in respective ones of the seats. Another aspect of the invention involves a face-milling method employing inserts similar to those described above.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 shows a tetragonal cutting insert according to the present invention in a plan view;

FIG. 2 shows the cutting insert of FIG. 1 in a side view;

FIG. 3A shows the cutting insert in a cross-section according to line III—III in FIG. 1;

FIG. 3B shows an enlargement of a fragment of FIG. 3A;

FIG. 4 shows the cutting insert in a cross-section according to line IV—IV in FIG. 1;

FIG. 5 shows an alternative embodiment of a tetragonal cutting insert according to the present invention in a plan view;

FIG. 6 shows the alternative cutting insert in a side view;

FIG. 7 shows the alternative cutting insert in a cross-section according to line VII—VII in FIG. 5;

FIG. 7A shows an enlargement of a fragment of the insert of FIG. 7;

FIG. 7B is a view similar to FIG. 7A of yet another embodiment of the invention;

FIGS. 9 and 10 show magnifications of the tool's active corner for the two insert alternatives of FIGS. 1 and 5, respectively, as seen towards the plane of the active side faces of the cutting insert; and FIG. 11 shows an additional embodiment of a cutting insert according to the present invention in a plan view.

DETAILED DESCRIPTION OF PREFERRED EMBODIMENTS OF THE INVENTION

Figure 8:
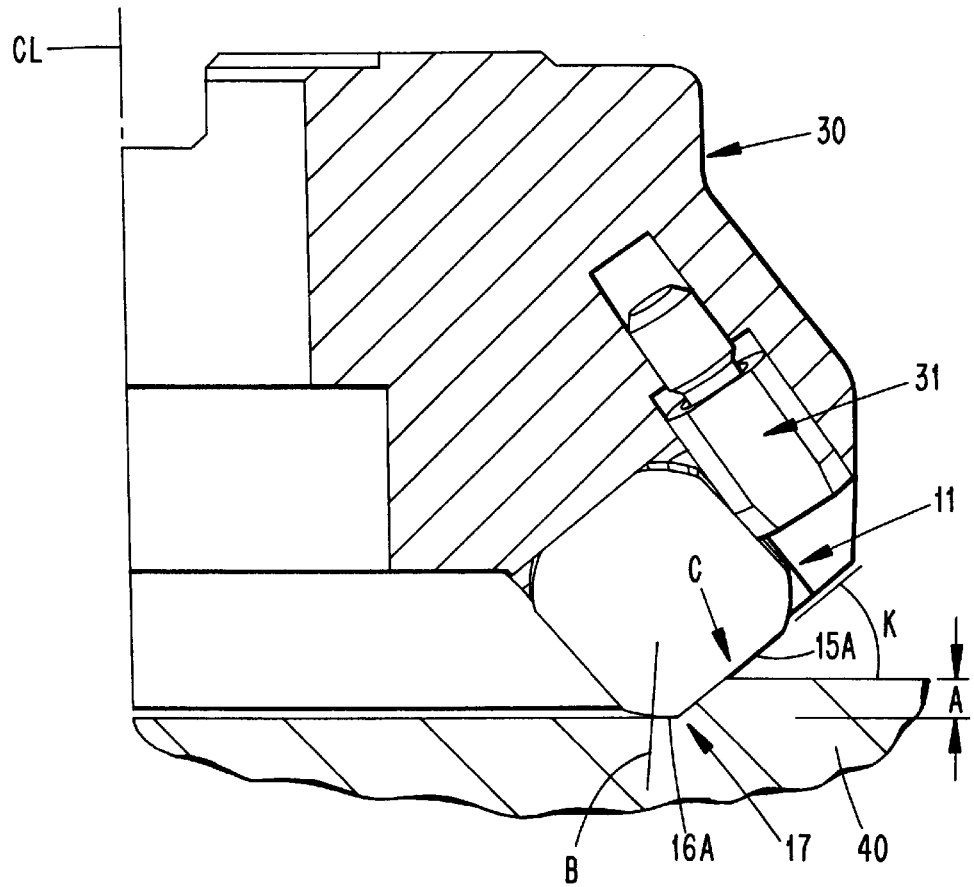
FIG. 8 shows a milling tool and insert according to the present invention in a side view making a cut.
Figure 9:
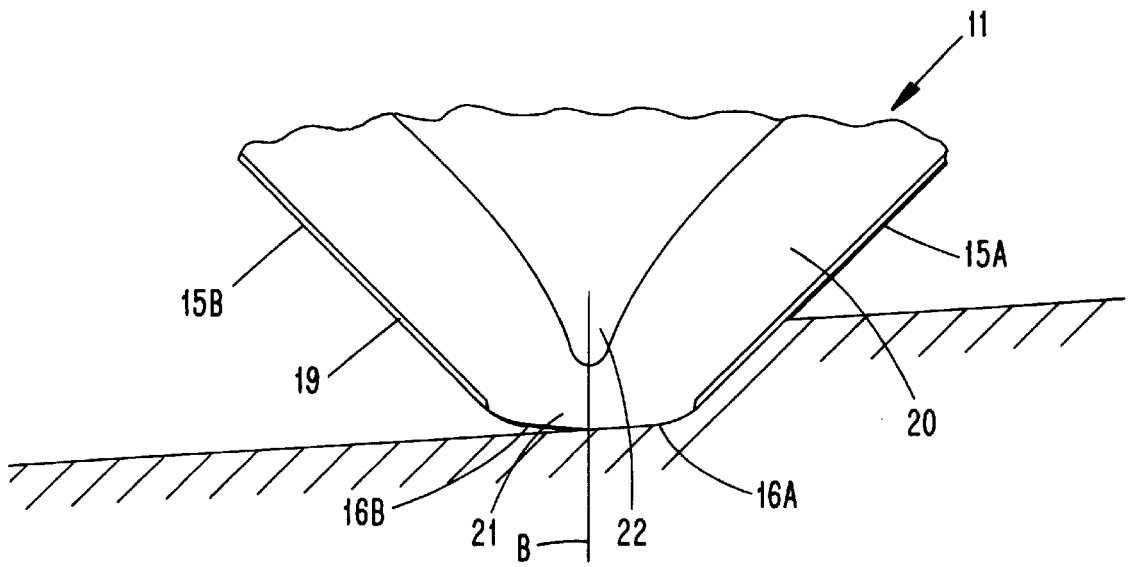

With reference to FIGS. 1–4, 8 and 9, there is shown a metal-cutting insert 11 for face milling according to the present invention. The cutting insert comprises a matrix of sintered, preferably coated, cemented carbide and has a polygonal basic shape, in this case a tetragonal basic shape. The cutting insert may alternatively be pentagonal or hexagonal. The cutting insert 11 comprises two, essentially parallel side faces 12, 13 interconnected by an edge surface structure comprised of edge surfaces 14A–14D. The side face 13 is identical to the side face 12, and therefore only one side face is described hereinafter. The cutting insert 11 has a negative geometry, i.e., the edge surface structure perpendicularly intersects the side faces. However, it is possible within the scope of the invention for the cutting insert to have a double positive geometry, i.e., each edge surface would form an acute angle with a respective side face and thus forms a central circumferential recess in each of the edge surfaces 14A–14D.

Major cutting edges 15 are formed by intersection of the side face 12 with respective edge surfaces 14A–D. In each cutting corner 17 located between two adjacent edge surfaces, there has been provided substantially planar or somewhat cambered bevel surfaces which form part of the edge surface structure. For example, between the edge surfaces 14A and 14B there are provided two bevel surfaces 18A, 18B disposed on opposite sides of the corner bisector B. The edges formed by the intersection of the side face 12 with the respective bevel surface 18A or 18B are called minor cutting edges 16. One of the edges 16 will generate a surface on the workpiece 40 during a face milling operation by being arranged parallel to the surface of the workpiece (or arranged perpendicular to the axis of the rotation of the milling tool). One of the major cutting edges 15 is intended to cut the major part of the material in the form of chips during the face milling operation. According to the invention, only one major cutting edge 15 and one minor cutting edge 16 will be in engagement with the workpiece simultaneously and thereby these two edges work in pair and define a cooperating pair of cutting edges. Each minor cutting edge 16 forms an acute external angle α with a projection of an associated major cutting edge 15 as viewed in a direction perpendicular to the side face 12. The angle α lies in the interval 38° to 42°, preferably around 40°.

Each major cutting edge 15 inwardly connects to a chip-upsetting surface or primary bevel 19, FIG. 3B, which constitutes the most peripheral part of the side face 12. The primary bevel is negatively angled and does not extend along the cutting corner 17, since the minor cutting edge 16 must be as sharp and as easy-cutting as possible. That is, a suitable edge radius on the minor cutting edge 16 is chosen, whereby the minor cutting edges are sharper than the major cutting edges. A first concave chip forming surface 20 is situated inside the chip-upsetting surface 19. A second concave chip forming surface 21 is situated inside the minor cutting edge 16 in the cutting corner. The second chip forming surface 21, FIG. 4, is shallower than the first chip forming surface 20, for shaping the chips during the face milling operation. An area 22 is provided in the side face 12, symmetrically about the corner bisector B to further form favorable chips and for best supporting the cutting corner.

In side view, it is evident that the minor cutting edges 16 are provided in planes oriented parallel with the side faces but somewhat below the associated side face. Each minor cutting edge 16 connects to the associated major cutting edge 15 via a radius R1. Alternatively the radius R1 can be replaced by a number of planar facets which together form a curve. The expression "cooperating" major cutting edge and minor cutting edge refers to a pair of major and minor cutting edges which cooperate during milling and which are physically connected to each other, possibly via a radius. The two minor cutting edges 16 of each cutting corner together form an obtuse inner angle ε, which is about 170° and the minor cutting edges are mirror-imaged or symmetrical about the bisector B.

Adjacently disposed bevel surfaces 18A, 18B intersect along a line E, which coincides with the plane of the bisector. Each major cutting edge 15 is concavely curved with a radius R2 to form a somewhat positive axial angle even though the cutting insert has been mounted negative in the milling body. The radius R2 is longer than the length L of the side of the cutting insert. The largest distance D between the major cutting edge and the plane of the connected side face is at the midline M of the major cutting edge, said distance being smaller than 1 mm but bigger than 0.4 mm.

To be able to use all 16 cutting edge pairs (eight pairs per side surface) in the most optimal manner, the major cutting edge 15 should be used not more than to its center point C, i.e., to the middle of the cutting insert during a milling operation (see FIG. 8). This means that the cutting depth A (see FIG. 8) should not be so great as to cause more than one half of the major cutting edge 15 to engage the workpiece 40, i.e., the cutting depth should maximum be A=(L/2)(sin K), where K is the setting angle (see FIG. 8). As a result only one of the minor cutting edges 16 engages the workpiece.

With reference now to FIGS. 5–7 an alternative embodiment of a face-milling cutting insert 11' is shown according to the present invention. The same items in the alternative embodiment have been given the same reference numbers with a prime symbol. The cutting insert 11' is different from the earlier described cutting insert in that it comprises a number of recesses 23' in each concave chip forming surface 20', which recesses are spaced along the major cutting edges 15' and extend essentially laterally relative to the associated major cutting edges 15'. No recesses 23' are located in the cutting corners. The recesses are provided in groups of seven or the like, the groups disposed on opposite sides of the mid-line M' of the cutting insert. Crests 24' are situated between the recesses 23' in the chip forming surface 20', each crest 24' bridging adjacent recesses 23' in a direction along the associated major cutting edge 15'. The recesses 23' do not extend perpendicularly to the cutting edge 15' but they rather form an acute angle B' with a line extending perpendicular to the associated cutting edge 15', such as shown in FIG. 5. The angle B' is in the interval of 5°–55°, preferably in the interval of 10°–20°. A most preferred value for the angle B' is 15°. An advantage with this type of chip former is that relatively little heat is transferred to the cutting insert from the chip and therefore problems which relate to high temperatures in the cutting edge 15', such as plastic deformation and/or diffusional wear, are avoided. This limits the wear of the cutting edge and results in better tool life also at high temperatures. Such a type of chip forming is more closely described in U.S. Pat. No. 5,074,720 which is hereby incorporated herein by reference for a description of chip forming.

In FIG. 8 there is shown a face milling cutter according to the present invention, including a milling body 30 intended to be rotated in a milling machine about an axis CL. The milling body comprises a number of seats for receiving tetragonal, pentagonal or hexagonal cutting inserts, such as the tetragonal insert 11 or 11'. A conventional adjustment device 31 is provided in order to facilitate fine adjustment of the cutting insert in the cutting insert pocket. The cutting insert is provided to be clamped in a known manner with a clamp after fine adjustment has been made. As is apparent from the figure, the cooperating major cutting edge 15A and minor cutting edge 16A are provided on the same side of the bisector B. The active minor cutting edge 16A is arranged substantially perpendicular to the axis of rotation CL of the face milling cutter. The minor cutting edge 16A (FIG. 9) generates the surface of the workpiece while the other minor cutting edge 16B is spaced at a distance from the workpiece surface by forming a clearance angle with said surface. The tool has a setting angle K, which is maximum 42°. The major cutting edge 15A is provided to cut the major part of the material which shall be machined in the form of chips and should therefore be reinforced by means of the chip-upsetting surface 19, while the minor cutting edge 16A constitutes a finish cutting edge and should therefore be sharper than the major cutting edge 15A.

In FIGS. 8 and 10 the cutting inserts 11 and 11', respectively, are shown in engagement with the workpiece 40. The tool works with a setting angle K or K' of about 40°.

FIG. 11 shows a pentagonal cutting insert 11", wherein the setting angle K" is chosen in the interval of 15° to 30°, preferably between 20° and 25°. The cutting insert 11" has twenty pairs of cooperating cutting edges 15", 16".

Thus the present invention relates to a method, a tool and a cutting insert for face milling wherein at least sixteen new cutting edges can be utilized. The cutting insert has at least eight pairs of cutting edges to be used in one rotational direction and at least eight pairs of cutting edges to be used in an opposed rotational direction, which makes utilization of the insert economically advantageous.

The invention is in no way limited to the above described embodiments. For example the basic shape of the cutting insert be pentagonal or hexagonal. In addition the recesses 23' may be replaced by projections 123' of similar shape as shown in FIG. 7B. Also in other respects the invention can be freely varied within the limits of the appended claims.

What is claimed is:

1. An indexable face-milling metal-cutting insert comprising two substantially parallel side faces interconnected by an edge surface structure to define at least four and not more than six cutting corners; an intersection of said edge surface structure and each of said side faces at each of said cutting corners forming a pair of minor cutting edges intersecting one another substantially at a bisector of said cutting corner to form an obtuse angle therebetween; an intersection of said edge surface structure and each of said side faces at locations between adjacent ones of said cutting corners forming major cutting edges; each major cutting edge intersecting an associated one of said minor cutting edges, whereby each major cutting edge and its associated minor cutting edge together define a cooperating pair of cutting edges; there being at least eight of said cooperating pairs on each of said side faces; said insert being indexable to bring only one of said cooperating pairs at a time into cutting relationship with a workpiece, with said side face being operable as a chip surface and said edge surface structure operable as a clearance surface; each side face including two of said cooperating pairs at each of said cutting corners, said two pairs disposed on opposite sides of said corner bisector; said minor cutting edges being sharper than said major cutting edges, each of said side faces including concave chip-forming surfaces disposed inwardly of said major and minor cutting edges.

2. The insert according to claim 1, wherein each of said minor cutting edges forms an acute angle together with an extension of its associated major cutting edge, said acute angle being in the range of 38 to 42 degrees.

3. The insert according to claim 2 wherein said acute angle is 40 degrees.

4. The insert according to claim 1 wherein said obtuse angle is about 170 degrees.

5. The insert according to claim 1 wherein the edge surface structure includes two surfaces in each of said corners which intersect said side faces to form said minor cutting edges, said two surfaces being planar and intersecting one another along a line lying in a plane which contains said corner bisector.

6. The insert according to claim 5 wherein each of said side faces includes a planar land disposed between each of said major cutting edges and its respective chip forming surface; each of said minor cutting edges directly intersecting its respective chip forming surface.

7. The insert according to claim 1 wherein each of said concave chip forming surfaces disposed inwardly of said major cutting edges includes a row of recesses each extending in a direction forming an acute angle of 5 to 55 degrees with a line extending perpendicular to the associated major cutting edge.

8. The insert according to claim 7 wherein the acute angle is 10 to 20 degrees.

9. The insert according to claim 8 wherein the acute angle is about 15 degrees.

10. The insert according to claim 1 wherein each of said concave chip forming surfaces disposed inwardly of said major cutting edges includes a row of projections each extending in a direction forming an acute angle of 5 to 55 degrees with a line extending perpendicular to the associated major cutting edge.

11. The insert according to claim 10 wherein the acute angle is 10 to 20 degrees.

12. The insert according to claim 11 wherein the acute angle is about 15 degrees.

13. The insert according to claim 1 wherein each of said side faces includes a planar land disposed between each of said major cutting edges and its respective chip forming surface; each of said minor cutting edges directly intersecting its respective chip forming surface, said land having a constant width.

* * * * *